United States Patent [19]
Nygaard et al.

[11] 4,097,788
[45] Jun. 27, 1978

[54] CONTROL CIRCUIT FOR A SELF-STARTING ELECTRIC MOTOR

[75] Inventors: Nils Hansson Nygaard, Sonderborg; Kaj Nielsen; Benny Strandtoft, both of Nordborg, all of Denmark

[73] Assignee: Danfoss A/S, Nordborg, Denmark

[21] Appl. No.: 750,728

[22] Filed: Dec. 15, 1976

[30] Foreign Application Priority Data

Dec. 17, 1975 Germany .......................... 2556726

[51] Int. Cl.[2] ............................................ H02P 1/00
[52] U.S. Cl. .................... 318/415; 318/138; 318/397; 318/431
[58] Field of Search ............ 318/138, 254, 387, 389, 318/391, 396, 397, 410, 411, 415, 416, 403, 430, 431

[56] References Cited
U.S. PATENT DOCUMENTS

| | | | |
|---|---|---|---|
| 3,543,114 | 11/1970 | Tadakuma et al. | 318/138 |
| 3,706,923 | 12/1972 | Dunfield | 318/415 |
| 3,750,000 | 7/1973 | Bruckner et al. | 318/138 |

*Primary Examiner*—Robert K. Schaefer
*Assistant Examiner*—M. K. Mutter

[57] ABSTRACT

The invention relates to a control circuit for a self-starting electric motor of the type having stator windings in respective series relation with gate type electronic switches which are controlled by control impulses generated in a gate circuit. A motor starting pulse generator is connected to the gate circuit which generates short starting pulses and long blocking pulses. Motor operating controls responsive to commutation impulses are connected to the gate circuit which override the effects of the motor starting pulse generator during normal operation. An integrator for the commutation pulses generates a voltage level signal which corresponds to the speed of the motor. A comparator compares this signal with a reference voltage and, when the signal reaches a predetermined level, the motor starting generator is overriden. When the motor is stopped for any reason the short starting pulses attempt to start the motor at intervals determined by the length of the blocking signals. By way of example, the short starting pulses could have 0.28 seconds duration compared to 22.4 seconds duration for the blocking pulses.

2 Claims, 5 Drawing Figures

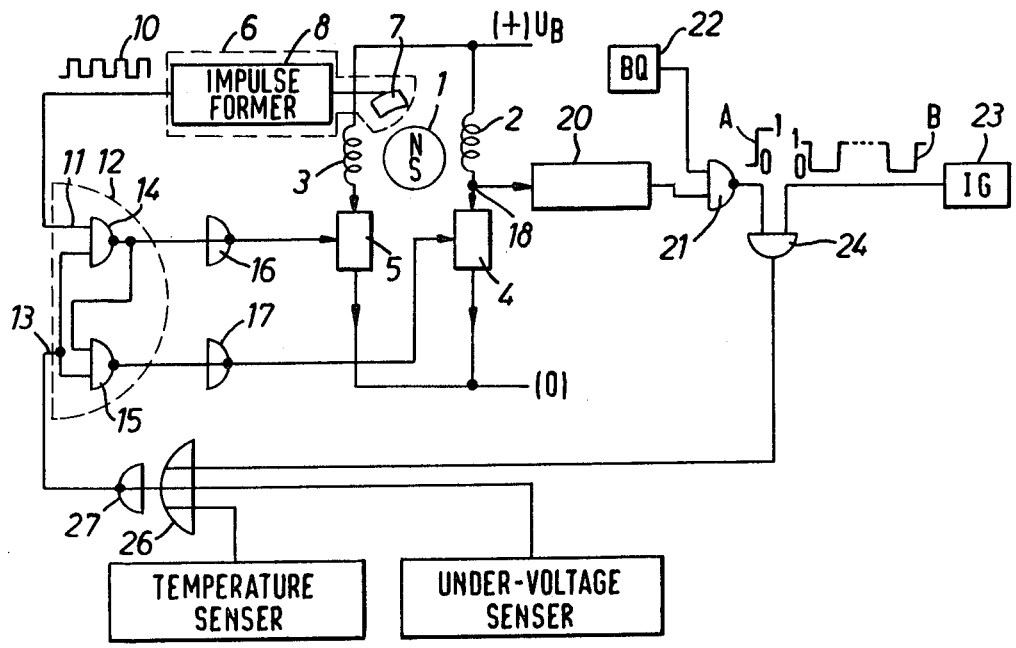
FIG. 1
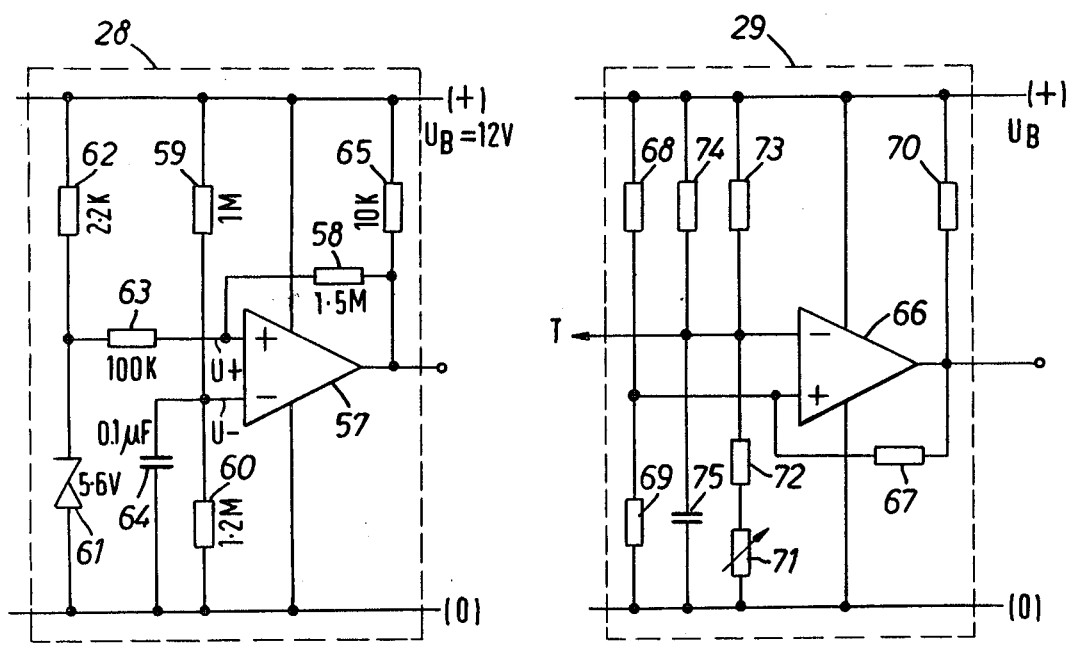
FIG. 3
FIG. 4

CONTROL CIRCUIT FOR A SELF-STARTING ELECTRIC MOTOR

The invention relates to a control circuit for a self-starting electric motor with at least one stator winding and an electronic servo-element which is applied in series therewith to a DC operating voltage, acts as a switch and is controlled by control impulses by way of a gate circuit.

Electric motors of this kind are often constructed in the form of brushless DC motors, the control impulses being driven from a control signal that represents the rotary position of the rotor. These brushless DC motors are particularly suitable for operating refrigerator cabinets or the like in low-voltage installations, e.g. caravans and holiday homes, merely requiring a motor vehicle accumulator of for example 12 volt as the source of operating voltage.

For certain applications, e.g. when operating refrigerator compressors, it is desired that such motors be provided with over-current protection for the electronic servo-elements that often comprise transistors, such protection being desired in case the rotor is held stationary against an excessive counter-pressure, for example during starting. If the rotor is blocked, it is not always certain that the control signal derived from its rotary position has a value such that the electronic servo-element is blocked. It could be the case that only the low ohmic resistance of the stator winding limits the current and this is generally insufficient. Further, an energy loss arises that is particularly important in the case of operation by battery.

In a known method for limiting the current, a current measuring resistance is in series with the stator winding. When the voltage at this measuring resistance exceeds a predetermined value, a monitoring circuit responds to interrupt the control signal by way of a gate circuit and in this way block the switching transistor of the servo-element that is in series with the stator winding. The result is that the stator winding current is likewise interrupted but is practically immediately switched on again because the monitoring circuit again scans the gate circuit upon interruption of the stator winding current and the control signal again controls the switching transistor. This procedure is repeated as long as the rotor remains blocked. The motor and the servo-element therefore continue to be subjected to a comparatively high load and must, for reasons of safety, be over-dimensioned. Further, the voltage drop occurring at the measuring resistance results in a reduction in the avaiable motor voltage, which primarily hinders starting and involves an energy loss even during normal operation.

The invention is based on the problem of providing a control circuit of the aforementioned kind which avoids overloads and consequential energy losses by reason of blocking of the rotor and ensures reliable starting of the motor.

According to the invention, this problem is solved in that the gate circuit can be supplied by an impulse generator alternately with comparatively short starting signals or gating signals and longer stopping signals as blocking signals which are supplied at the instant of starting and without hindrance when the rotor is blocked and, during normal operation, are overridden by a normal-running signal which constantly monitors the gate circuit.

On switching the motor on, the first starting attempt is made when the first starting signal is supplied by the impulse generator. If the motor fails to start, the supply of the control impulse to the electric servo-element is blocked by the gate circuit during the period of the following stopping signal of the impulse generator. Only on the occurrence of the next starting signal will a new starting attempt be made. If the motor runs, operation is continued by reason of the overriding normal-running signal.

If the motor is blocked during operation, the normal-running signal disappears and the motor is switched off by a stopping signal of the impulse generator. Thereafter, a starting attempt is again made automatically on the occurrence of the next starting signal. The starting attempts consequently occur only momentarily after longer pauses so that the stator winding or the servo-element are not overloaded. If a blockage disappears by itself, the motor restarts automatically.

The normal-running signal is desirably dependent on the rotation of the rotor. When the rotor is at a standstill, no normal-running signal is produced so that the starting and stopping signals of the gate circuit can be supplied alternately.

The measuring signal required for producing the normal-running signal can be derived from the commutation impulses of the motor. In this way one dispenses with special equipment for determining standstill or rotation of the motor.

It is particularly simple if rotation of the rotor is determined by means of the occurrence of AC voltage pulses at a measuring point. The occurrence of a signal of constant polarity then signifies a standstill of the motor regardless of the amplitude of the signal.

Different signal levels of a measuring signal may be associated with rotation and standstill of the rotor. This makes simple differentiation between rotation and standstill possible.

A particularly simple construction results in that the normal running signal depending on rotation of the rotor can be supplied to a first input and a reference voltage to a second input of a comparator and the output signal of the comparator that can assume two values depending on the result of the comparison can be fed to the gating input of the gate circuit, and that the comparator output signal can be overridden by a starting signal of the impulse generator.

In this case the first input of the comparator may be preceded by an impulse sequence frequency measuring element serving as a retarding element. This ensures that the signal at the first comparator input reaches the value of the reference voltage at the other comparator input only when a plurality of impulses have occurred at the input of the impulse sequence frequency measuring element within the measuring period unit and thereby indicate that the motor has attained full speed.

Preferably, it is ensured that the impulse sequence frequency measuring element comprises a rectifier and, downstream thereof, an RC element of which the charging time constant is less than its discharging time constant but larger than the duration of a potential impulse which is initiated by or for rotation of the rotor, and that the discharging time constant is larger than the interval between two consecutive potential impulses at nominal rotary speed. This RC element is charged to a value above the response value of the comparator only after a plurality of potential impulses and it retains this charge at least until the motor has attained full speed and delivers further potential impulses that maintain the charge. The rectifier in this case ensures that the RC element does not immediately discharge again either through the servo-element or to the source of reference voltage after a potential impulse has disappeared. If, however, no further potential impulses are being produced because the rotor is blocked, the RC element can discharge to below a value at which the comparator responds and produces an output signal at the value associated with the standstill. Preferably, therefore, the reference voltage is selected so that the measuring signal is lower than the reference voltage when the rotor is blocked and higher during normal operation.

In this connection is is favourable if the reference voltage depends on the DC operating voltage of the motor. In this way, fluctuations of the DC operating voltage not only affect the measuring signal but also the reference voltage, namely in the same sense, so that any resultant errors in the result of the comparison are substantially balanced out.

Preferably, a measuring signal dependent on the potential of the connecting point between the stator winding and servo-element can be fed to the input of the comparator by way of the impulse sequence frequency measuring element. In this arrangement a measuring resistor is dispensed with in the current circuit of the stator winding because the potential of the connecting point between the stator winding and the servo element already clearly indicates whether the rotor is stationary or turning. It is stationary at a low potential and running at a high potential. By means of self-induction in the stator winding, each interruption in the stator winding current occasioned by the servo-element creates a voltage in the stator winding that acts in the same direction aa the DC operating voltage $U_B$, i.e. is added to $U_B$. The self-induced voltage is substantially equal to $U_B$. The potential tapped at the connecting point between the servo-element and the stator winding therefore fluctuates by about 2 $U_B$ during operation in rhythm with the switching procedure. On standstill, however, the potential remains at about 0 or about $U_B$, depending on whether the servo-element is then conductive or non-conductive. However, the measuring signal reaches its highest value in any case when potential impulses with a maximum value of about 2 $U_B$ occur at the connecting point between the stator winding and the servo-element. The comparator output signal therefore assumes one or the other value depending on whether the measuring signal is higher or lower than the reference voltage in dependence on the potential at the connecting point and possibly blocks the gate circuit and thus the control signal fed to the servo-element, so that the servo-element becomes or remains non-conductive.

In a control circuit of the aforementioned kind comprising a permanent magnet rotor and a converter device responsive to the rotor field for producing the servo-element control impulses, the control impulses can be supplied to the impulse sequence frequency measuring element by way of a coupling condenser. The coupling condenser only permits the AC signal proportion of the control impulses to pass in order to indicate rotation of the rotor.

The rectifier of the impulse sequence frequency measuring element may be connected in shunt so that it only permits the pulses of one polarity to pass and short-circuits the others.

When using a second stator winding with a series-connected servo-element in the form of an electronic switch, the gate circuit may comprise two push-pull switching stages in series with a common switching element, the control signal being passed through both switching stages and fed to the one servo-element from the output of the one end to the other servo-element from the output of the other switching stage and the normal-running signal being fed to the control input of the switching element. This construction ensures in a simple manner that both servo-elements are fed with counter-acting control signals as long as the motor is running but, upon blocking of the rotor, both control signals are removed simultaneously by the common switching element.

The output signal of the comparator may be linked to the impulses of the impulse generator such that only the impulses of the impulse generator can be fed to the gate circuit when the motor is blocked and these impulses are blocked during normal operation of the motor. These impulses continously initiate a starting attempt until the rotor is no longer blocked and reaches full speed. When the motor is running, the comparator output signal then blocks or overrides the starting impulses.

Preferably, the gating ratio of the impulses of the oscillating impulse generator is selected so that they gate the gate circuit during a considerably shorter time than 50% of their period. Oscillation of the impulse generator ensures that, when the rotor is blocked, the repeated starting attempts are initiated automatically whilst the short period of the starting impulses ensures that an attempt at starting is always made only momentarily and overloading of the blocked motor by repeated starting attempts is avoided.

The comparator may comprise a differential amplifier with flip-flop behaviour. It brings about a very rapid change in the comparator output signal when the measuring signal on the input side exceeds or falls below the reference voltage.

The impulse generator may comprise a co-coupled differential amplifier. Differential amplifiers are readily available marketed components which are generally obtainable only in multiples in a structural group, particularly in the form of integrated circuits. When using a plurality of differential amplifiers, these structure groups can therefore be more favourably utilised.

Preferably, the outputs of the differential amplifiers are directly connected. In this simple way one already obtains the stated interlinkage between the comparator output signal and the starting impulses.

The gate input of the gate circuit may be preceded by an OR element. The OR element permits the selective connection of at least one senser, depending on the number of inputs of the OR element, so as to monitor other physical quantities of the control circuit, of the motor or of the surroundings and to control the motor with same.

A senser acting on the OR element may comprise a bistably connected differential amplifier. In this way a further differential amplifier of a structural group comprising several differential amplifiers can be utilised and this further differential amplifier at the same time delivers the two-value output signal for controlling the gate circuit.

It is then favourable for the differential amplifier to have hysteresis. In this way, unstable behaviour of the motor is avoided in the region of the trigger point with only slight fluctuation of the operating quantity that is being monitored.

Preferred examples of the invention will now be described in more detail with reference to the drawing, in which:

FIG. 1 is a block diagram of a control circuit according to the invention;

FIG. 3 is a circuit of an under-voltage senser according to FIG. 1;

FIG. 4 is a circuit of a temperature senser according to FIG. 1, and

Figure 2:
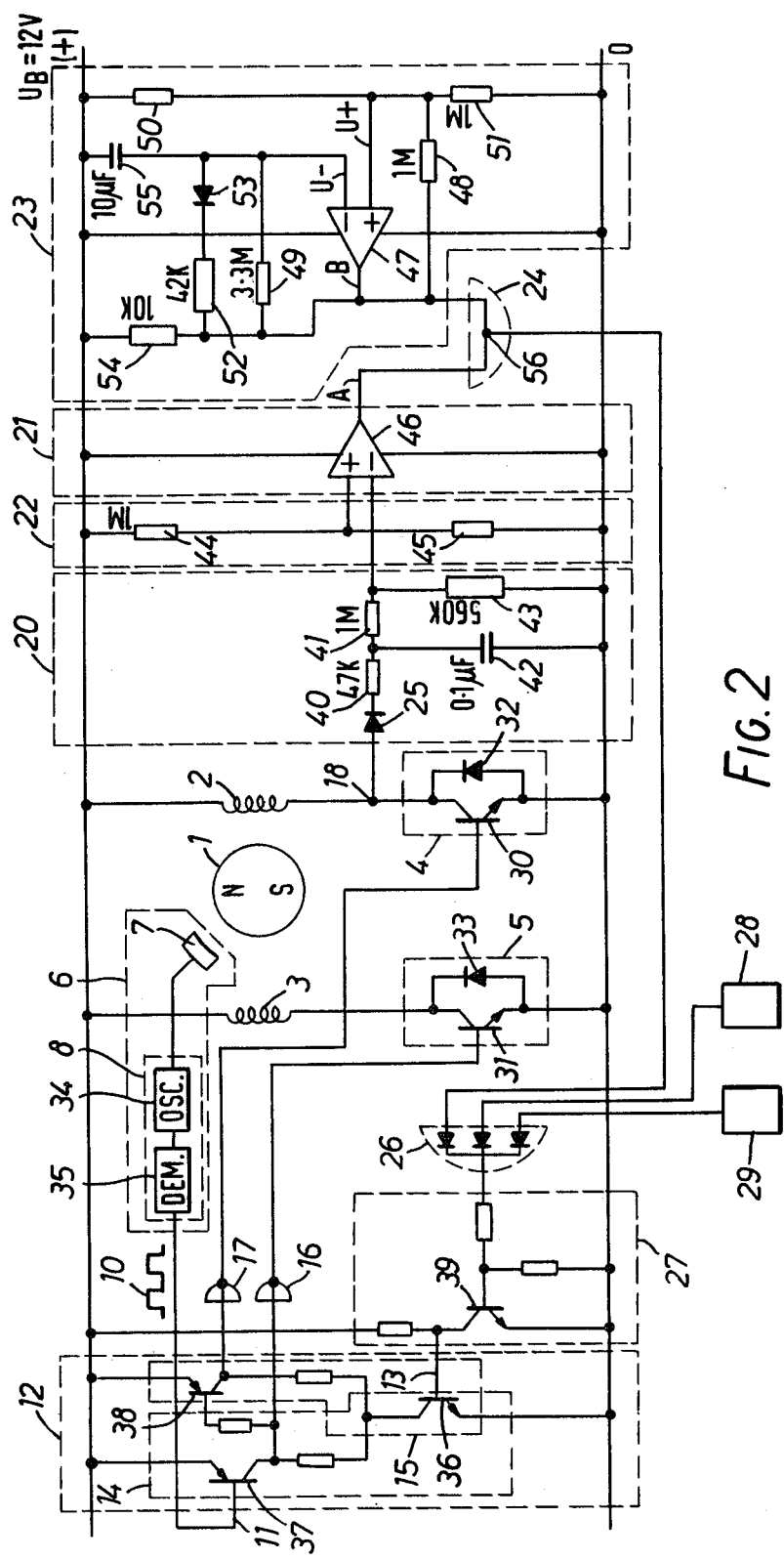
FIG. 2 is a more detailed circuit diagram of the control circuit according to FIG. 1.

FIG. 1 represents a control circuit for a brushless DC motor with a permanent magnet rotor 1 and two stator windings 2 and 3 which are applied to a DC operating voltage $U_B$ in series with a respective electronic servo-element 4 or 5 operating as a switch. A converter device 6 receives a magnetic field-dependent component 7 and an impulse former 8 downstream thereof. The magnetic field-dependent component 7, e.g. a coil with saturatable core, lies in the magnetic field of the rotor 1 and delivers a signal which, after each half turn of the rotor, assumes the other of two values. This signal is converted by the impulse former 8 to a sequence of impulses 10 of which the gating ratio (impulse duration/period) is equal to 1:2. These impulses 10 are fed to the input 11 of a gate circuit 12. The other input 13 of the gate circuit 12 serves as a gate input. The gate circuit 12 contains two NAND elements 14 and 15 of which the gate inputs are connected. Further, the output of the first NAND element 14 is connected to the other input of the second NAND element 15. The outputs of the NAND elements 14 and 15 simultaneously form the outputs of the gate circuit 12 and are each connected by a NOT element 16 or 17 in the form of inverted amplifiers to the control inputs of the servo-elements 5 or 4, respectively.

The connecting point 18 between the stator winding 12 and the servo-element 4 is connected by way of an impulse sequence frequency measuring element 20 to the one input of a comparator 21 which has the function of a NAND element. A reference voltage source 22 is applied to the other input of the comparator 21. The output signal A of the comparator 21 is linked to the output signal B of an impulse generator 23 by means of an AND element 24. The output signal of the AND element 24 is fed to the gate input 13 of the gate circuit 12 by way of an OR element 26 and a NOT element 27 downstream thereof. Two further inputs of the OR element 26 are each occupied by an under-voltage senser 28 and a temperature senser 29.

The servo-elements 4 and 5 are controlled by 1-signals and blocked by 0-signals. The sensers 28 and 29 indicate a normal condition of the physical quantities sensed by them by delivering a 0-signal but an abnormal condition by delivering a 1-signal.

The first case to be considered in the following description is where the sensers 28 and 29 indicate a normal condition and thus deliver a 0-signal.

On switching on the motor, the impulse generator 23 immediately produces a 0-impulse B which lasts beyond the starting period of the motor. In contrast, no positive impulse occurs as yet at the connecting point 18. This is the case only on interruption of the control winding current. The impulse sequence frequency measuring element 20 therefore delivers an 0-signal to the comparator 21 so that a 1-signal (A = 1) occurs at the comparator and the AND element 24 is gated. The zero impulse B that still obtains is, however, continued to be fed as a 1-signal to the gate input 13 of the gate circuit 12 by reason of the inversion by the NOT element 27 and it gates the gate circuit 12. One of the two servo-elements 4 or 5 thereby receives a 1-signal, depending on whether a 1-signal or a 0-signal obtains at the input 11. When the rotor 1 first assumes a rotary position such that the signal 10 is an 0-signal, a 1-signal occurs at the output of the NAND element 14 and this is fed as a 0-signal to the control input of the servo-element 5 by way of the NOT element 16 and holds same in the blocked condition. In contrast, the NAND element 15 delivers a 0-signal which is fed as a 1-signal to the control input of the servo-element 4 by way of the NOT element 17 and controls same. However, if the signal 10 was a 1-signal in the stationary condition of the rotor 1, then the servo-element 5 is controlled first. Controlling of the one or the other servo-element 4 or 5 starts the motor, so that positive impulses also occur at the connecting point 18 with a sequence frequency having a value such that the impulse sequence frequency measuring element 20 delivers a measuring signal which is equal to or larger than the reference voltage delivered by the reference voltage source 22. This corresponds to the case where both inputs of the comparator 21 are occupied by a 1-signal. The comparator output signal A therefore changes from '1' to '0' and blocks the AND element 24 and thus also 1-impulses B. This means that the gate input 13 is continued to be fed with a 1-signal which gates the gate circuit 12 and now permits impulses 10 to be passed at shorter intervals while the motor is running, so that the control input of the servo-elements 4 and 5 is alternately fed with 1-signals in the rhythm of the impulses 10. Accordingly, the frequency of the impulses at the junction 18 also remains so high that the measuring signal at the output of the impulse sequence frequency measuring element 20 remains as a 1-signal and the output signal A remains an 0-signal indicating normal operation.

However, when the motor or rotor 1 is blocked, e.g. through overloading, the sequence frequency of the impulses 10 and thus the frequency of the impulses at the junction 18 finally drops off to such an extent that the measuring signal at the output of the impulse sequence frequency measuring element 20 falls below the reference voltage or disappears entirely, whereby the output signal A of the comparator 1 changes from '0' to '1'. The result is that the starting impulses B are now again allowed to pass by the AND element 24 and automatically carries out a starting attempt with each 0-impulse until the blockage has disappeared, for example by itself, and the motor is again at full speed. However, the period of the 0-impulses of the signal B, which may be about 0.28 seconds, is so short in comparison with the total period of the signals B, which may be about 22.4 seconds, that these starting impulses B equal to 0 have no detrimental influence on the motor in the block condition of the latter. In the blocked condition, by reason of the repeated interruption of the current in the stator coil 2, positive impulses occur at the junction 18 because of the 1-impulses B in such a position of the rotor 1 that the input 11 of the gate circuit 12 is occupied by a 0-signal 10 during the period of blockage. However, these positive impulses have the same low frequency as the impulses B, so that the impulse sequence frequency measuring signal does not exceed the reference voltage and no normal condition is signalled by a 0-signal A at the output of the comparator 21.

Since a measuring period unit must be maintained to measure the impulse sequency frequency of the positive impulses occurring at the junction 18, the time element contained in the measuring element 20 and determining the measuring period unit is so designed that one also obtains the delay period required to be maintained for the motor to reach full speed during normal operation until the normal condition is signalled by the appearance of the signal A = 0 and the starting impulses B are blocked.

If, on the other hand, the senser 28 and/or 29 delivers a 1-signal and thereby indicates that the operating quantity sensed by it is not in a normal condition, for example the temperature of the motor is too high or the operating voltage is too low, then this 1-signal controls the output signal of the AND element 24, so that a blocking signal occurs at the gate input 13 and thus also at the control input of both servo-elements 4 and 5 and the motor is switched off for the duration of the abnormal condition of the sensed operating quantity.

FIG. 2 is a more detailed circuit diagram of the control circuit according to FIG. 1. The servo-elements 4 and 5 each contain a transistor 30 or 31 with anti-parallel-connected overrunning diode 32 or 33. The impulse former 8 contains a controllable oscillator 34 which is switched on and off by impulses of the magnetic field-dependent component 7, it being under oscillation in the switched-on condition at a frequency of about 100 kHz and a downstream demodulator 35 producing a rectangular signal as a control signal 10 for the transistors 30 and 31 that corresponds to the enveloping curve of the oscillator oscillations that occur and disappear in accordance with the rotary speed or the rotor 1. The NAND elements 14 and 15 of the gate circuit 12 contain two push-pull transistor switching stages, a switching element in the form of a transistor 36 being common to both switching stages. By way of a respective resistor, the transistor 36 is in series with a further transistor 37 or 38 and the output of the transistor 37 on the collector side is connected to the base of the transistor 38 by way of a resistor. If, therefore, the common transistor 36 is blocked because a zero signal is fed to the gate input 13, practically no current can flow through the transistors 37 and 38, so that both transistors 37 and 38 deliver a 1-signal on the output side which is delivered to the transistors 30 and 31 by reason of the inversion in the NOT elements 16 and 17 to form blocking 0-signals.

The NOT element 27 likewise contains a transistor 39 connected as an inverted amplifier. The OR element 26 consists of three diodes interconnected by their cathodes on the output side.

The impulse sequence frequency measuring element 20 contains an RC element in series with a rectifier 25, the RC element comprising two longitudinal resistors 40 and 41, a shunt condenser 42 and a shunt resistor 43. With the stated values of the resistors 40, 41 and 42 and of the capacitance, the charging time constant of the RC element amounts to about 4.7 msec. and the discharge time constant about 0.156 sec. The reference voltage source 22 comprises a voltage divider formed by two resistors 44 and 45, its tapping being connected with the non-inverting input, hereinafter referred to as the plus input, of a differential amplifier 46 which as a trigger behaviour and is contained in the comparator 21, whilst the junction of the resistances 41 and 43 is connected to the inverting input, hereinafter referred to as the minus input, of the differential amplifier 46.

As soon as the potential at the minus input of the differential amplifier 46 exceeds that at the plus input, i.e. the reference voltage, the differential amplifier 46 delivers a 0-signal as output signal A. This is the case when, within the discharge time of the RC element 41–43, so many impulses occur at the junction 18 that their number suffices to charge the condenser 42 to a voltage resulting in a higher potential at the minus input than at the plus input of the differential amplifier 46. In this connection it must be considered that a single impulse at the junction 18 is so short that it has disappeared again within the charging time of the RC element 41–42, i.e. before the condenser 42 has been charged to the voltage required to trigger the differential amplifier 46. Several impulses are therefore necessary at the junction 18 before the reference voltage has been reached. Derivation of the reference voltage from the DC operating voltage $U_B$ by way of the voltage divider 44, 45 compensation for the influence of a fluctuation in the operating voltage on the trigger point of the differential amplifier 46 because it acts in the same sense at both inputs of the differential amplifier 46. The rectifier 25 prevents the condenser 42 from being discharged in the reverse direction.

The impulse generator 23 likewise contains a differential amplifier 47. This is so-coupled by way of a resistor 48 and counter-coupled by way of a resistor 49. A voltage divider formed by resistors 50 and 51 has its tapping at the plus input of the differential amplifier 47. In parallel with the counter-coupling resistor 49 there is the series circuit of a resistor 52 and a diode 53 which is connected on the anode side to the minus input of the differential amplifier 47. The output of the differential amplifier 47 is connected by a further resistor 54 to the positive pole of the operating voltage source and the minus input of the differential amplifier is connected thereto by a condenser 55.

When the DC operating voltage $U_B$ is switched on, the minus input of the differential amplifier 47 is fed with a positive voltage impulse by way of the condenser 55. Because of the parallel connection of the resistors 48 and 54 to the resistor 50, this positive voltage impulse immediately exceeds the voltage $U_+$ of about $\frac{2}{3} U_B$, so that the output signal B becomes a 0-signal and the diode 53 becomes conductive. The condenser 55 is charged through the diode 53 and the resistor 52 until the voltage $U_-$ falls below the voltage $U_+$, the latter having in the meantime dropped off to about $\frac{1}{3} U_B$ because of the differential amplifier 47 that is practically at zero potential on the output side and because of the parallel circuit necessitated thereby. As soon a $U_-$ has fallen below the voltage $U_+$, the output signal B rises. Since there is co-coupling through the resistor 48, this rise occurs suddenly corresponding to a trigger operation. Simultaneously, $U_+$ again rises to about $\frac{2}{3} U_B$ and the condenser 55 discharges substantially through the resistances 54 and 59 until the voltage $U_-$ again exceeds the value of $U_+ = \frac{2}{3} U_B$ and the output signal again switches over to '0'. Since the condenser 55 in the one switching condition B = 0 is charged much more rapidly through the comparatively low-ohmic resistor 52 than it discharges through the combined high-ohmic resistors 49 and 54 in the other switching condition B = 1, it being borne in mind that the reverse charging takes place at $U_- \approx \frac{1}{3} U_B$ or $\frac{2}{3} U_B$, the gating ratio of the output signal B is about 0.42/33.5, i.e. 1.25%, whilst the impulse sequence frequency of the impulse generator 23 is about 1/22.4 sec. This means that the impulse generator 23 produces a 0-impulse B of only about 0.28 sec. duration every 22.4 sec.

The output stage of the differential amplifier 46 is a transistor of which the collector is connected through an operating resistance to the positive pole of the operating voltage source. When this output transistor is conductive, the output of the differential amplifier 46 has about 0 volt steadily applied to it. The same applies to the output stage of the differential amplifier 47. To link the output signals A and B of the differential amplifiers 46 and 47 according to an AND function, it therefore suffices simply to interconnect the outputs of both differential amplifiers 46 and 47. The conductive output transistor will then short-circuit the other and an output voltage, i.e. a 1-signal, occurs at the junction 56 only when both output transistors are non-conductive.

FIG. 3 represents a more detailed circuit diagram of an under-voltage senser 28. It likewise contains a differential amplifier 57 which is co-coupled by way of a resistor 58. Two resistors 59 and 60 form a voltage divider of which the tapping is connected to the minus input of the differential amplifier 57. A Zener diode 61 with a Zener voltage of 5.6 volt is connected in series with a resistor 62 to $U_B$ and on the cathode side is connected to the plus input of the differential amplifier 57 by way of a resistor 63. A condenser 64 prevents momentary voltage fluctuations at the minus input of the differential amplifier 57. The output of the differential amplifier 57 is additionally connected by way of a resistor 65 to the positive pole of the operating voltage source.

With the stated values, the voltage $U_-$ at the minus input of the differential amplifier 57 amounts to only 12 V · 1.2:2.2 = 6.5 volt at a nominal operating voltage $U_B$ = 12 volt. The Zener voltage of 5.6 volt substantially determines the voltage $U_+$ at the plus input of the differential amplifier 57. Since the Zener voltage is lower than the normal voltage $U_-$ = 6.5 volt, the output of the differential amplifier 57 normally lies at about 0 volt. In this condition, the series circuit of the resistors 58 and 63 is in parallel with the Zener diode 61 so that $U_+$ 5.6 volt. 1.5:1.6 = 5.3 volt is obtained. When $U_B$ drops until $U_- = U_+ = 5.3$ volt, then the output voltage of the differential amplifier 57 changes to 'high', i.e. the differential amplifier 57 delivers a 1-signal which switches the motor off. This switching off therefore takes place when the operating voltage has dropped to 5.3 volt. 2.2:1.2 = 9.7 volt.

To avoid instability, the senser 28 should have hysteresis. When the output voltage is 'high', the voltage at the plus input rises because the direction of the voltage drop at the resistor 63 is reversed and one obtains U′− = 5.6 V · (1/16) · (9.7 V − 5.6 V) = 5.85 V.

Thus, $U'_B$ = 5.85 V · 2.2:1.2 = 10.7 V, and the hysteresis amounts to 10.7 V − 9.7 V = 1 V. This means that the under-voltage senser 28 does not immediately switch to 'normal' again when the operating voltage rises only slightly above 9.7 V. Instead, a rise of more than 1 V above 9.7 V is necessary.

According to FIG. 4, the temperature senser 29 likewise contains a differential amplifier 66 which is co-coupled by way of a resistor 67. In conjunction with the co-coupling resistor 67 and a further resistor 70 between the differential amplifier output and the plus pole of the operating voltage source, voltage divider resistors 68 and 69 determine the voltage at the plus input of the differential amplifier 67. A further voltage divider comprising resistors 71 - 74 determines the voltage at the minus input of the differential amplifier 66. The resistor 73 is a PTC resistor. It senses the operating temperature of the motor. The resistor 71 is adjustable. It serves to balance the pressures formed by the resistors 68, 69 on the one hand the resistors 71 to 74 on the other hand. The condenser 75 serves the same purpose as the condenser 64. When the motor temperature and thus the value of the PTC resistor 73 becomes so high that the voltage at the minus input has dropped off to the voltage at the plus input of the differential amplifier 66, the differential amplifier 66 triggers and a 1-signal appears at the output which switches the motor off. At the connection T a value analogous to the motor temperature can be derived.

The motor is switched on again only when the critical under-voltage as well as the critical over-voltage no longer occur.

Modifications of the illustrated example lie within the scope of the invention. Thus, the integers 20, 21 and 22 can be replaced by a counter which counts the impulses occurring at the junction 18 and is followed by a flip-flop and a time base generator which is initiated by each impulse and sets back the counter and the flip-flop after expiry of a set time unit. The coupling elements 12, 16, 17, 26 and 27 can also be replaced by equivalent coupling elements in accordance with the algebraic rules of switching theory, e.g the OR element 26 and the NOT element 27 can be replaced by a single NOR element, or the elements 14 to 16 can be replaced by an AND element instead of the NAND element 14 and by an INHIBIT element instead of the NAND element 15. Other circuit arrangements result from reversal of the statements in connection with the 0-signals and 1-signals.

Figure 5:
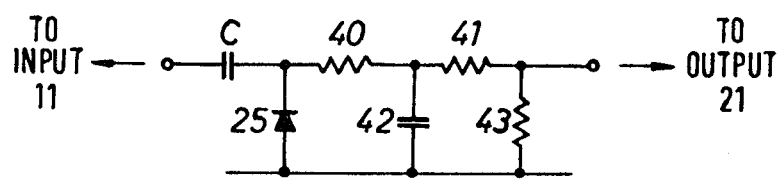
FIG. 5 is a modification of the control circuit according to FIG. 2.

Further, instead of the impulses occurring during commutation at the junction 18, the impulses 10 initiating commutation can be fed to the impulse sequence frequency measuring element 20 as an indication of rotation of the rotor 1. In this case the impulses 10 should be fed to the impulse sequence frequency measuring element 20 by way of a coupling condenser which only permits the AC signal proportion to pass and therefore forms a measuring signal at the comparator input only when the rotor 1 is turning. The rectifier 25 can then be applied transversely between the input lead and the zero lead of the impulse sequence frequency measuring element 20, so that it short-circuits negative impulses. The last-mentioned modification of the circuit according to FIG. 1 is illustrated in FIG. 5.

We claim:

1. A control circuit for a self-starting electric motor having at least one stator winding in series with a pulse controllable electronic switch, gate control means having A and B inputs and an output connected to said switch with a first signal for said A input causing blocking regardless of the signal on said B input and with the opposite signal for said A input providing a signal for said output and direct transmission between said input B and said output, a starting impulse generator having a duty cycle with a short starting signal and a long stopping signal, a pulse generator connected to said B input and being responsive to the position of the rotor of said motor for producing a pulse wave corresponding to the speed thereof, a frequency-to-voltage converter connected to said winding for generating a signal corresponding to the speed of said motor, a comparator and a reference voltage for said converter to generate a digital signal at a predetermined voltage level of said converter, selector gate means having inputs connected to said starting impulse generator and said comparator and the output thereof connected to said o input A, said selector gate means allowing said comparator signal to override said starting impulse generator when said motor has normal speed and allow said short starting signal thereof to be transmitted to said input A when said motor is stopped or operating below its normal operating speed.

2. A control circuit for a self-starting electric motor having first and second stator windings in respective series with first and second pulse controllable electronic switches, gate control means having A and B inputs and first and second outputs connected respectively to said first and second switches with a first signal for said input A causing blocking regardless of the signal on said input B and with the opposite signal for input A providing a signal for one of said outputs and toggling between said input B and said outputs, a starting impulse generator having a duty cycle with a short starting signal and a long stopping signal, a pulse generator connected to said input B and being responsive to the position of the rotor of said motor for producing a pulse wave corresponding to the speed thereof, a frequency-to-voltage converter connected to one of said windings for generating a signal corresponding to the speed of said motor, a comparator and a reference voltage for said converter to generate a digital signal at a predetermined voltage level of said converter, selector gate means having inputs connected to said starting impulse generator and said comparator and the output thereof connected to said input A, said selector gate means allowing said comparator signal to override said starting impulse generator when said motor has normal speed and allow said short starting signal thereof to be transmitted to said input A when said motor is stopped or operating below its normal operating speed.

* * * * *